United States Patent [19]

Sano et al.

[11] Patent Number: 5,659,456

[45] Date of Patent: Aug. 19, 1997

[54] MONOLITHIC CERAMIC CAPACITORS

[75] Inventors: Harunobu Sano, Kyoto; Hiroyuki Wada, Shiga-ken, both of Japan

[73] Assignee: Murata Manufacturing Co., Ltd., Japan

[21] Appl. No.: 585,478

[22] Filed: Jan. 16, 1996

[30] Foreign Application Priority Data

Jan. 12, 1995 [JP] Japan .................................. 7-003302
Jan. 12, 1995 [JP] Japan .................................. 7-003303

[51] Int. Cl.$^6$ .................... H01G 4/06; H01G 4/20; H01G 4/228; H01G 2/20
[52] U.S. Cl. ............... 361/321.4; 361/303; 361/305; 361/306.3; 361/308.1; 361/313; 361/320; 361/321.5
[58] Field of Search ...................... 361/303, 305, 361/306.1, 306.2, 306.3, 308.1, 311–313, 320, 321.1, 321.2, 321.3, 321.4, 321.5, 323

[56] References Cited

U.S. PATENT DOCUMENTS 4,086,649  4/1978  Hanold, III ..................... 361/321
5,117,326  5/1992  Sano et al. ...................... 361/321

FOREIGN PATENT DOCUMENTS 57-42588   9/1982   Japan .
60-170188  9/1985   Japan .
61-14611   4/1986   Japan .
61-101459  5/1986   Japan .
62-256422  11/1987  Japan .

Primary Examiner—Bot L. Ledynh
Attorney, Agent, or Firm—Ostrolenk, Faber, Gerb & Soffen, LLP

[57] ABSTRACT

Disclosed is a monolithic ceramic capacitor comprising dielectric ceramic layers and inner electrodes wherein each dielectric ceramic layer comprises an essential component having a compositional formula of $(1-\alpha-\beta)(BaO)_m TiO_2 + \alpha Y_2 O_3 + \beta(Co_{1-x} Ni_x)O$ (where the alkali metal content of $BaTiO_3$ is not more than 0.03% by weight, $0.0025 \leq \alpha \leq 0.03$, $0.0025 \leq \beta \leq 0.06$, $0 < \beta/\alpha \leq 6$, $0 < x \leq 1$, $1.000 \leq m \leq 1.035$), and a side component consisting of, relative to 100 mols of the essential component, from 0.5 to 3.0 mols of MgO and from 0.05 to 2.0 mols of MnO, and from 0.2 to 3.0 parts by weight 100 parts by weight of the sum of the main component and the side component, of oxide glass of $Li_2O-RO-(Ti,Si)O_2$ (where R indicates at least one of Ba, Sr, Ca and Mg). Also disclosed is such a monolithic ceramic capacitor where the Co is replaced by Zn and x is less than 1.

20 Claims, 1 Drawing Sheet

MONOLITHIC CERAMIC CAPACITORS

FIELD OF THE INVENTION

The present invention relates to ceramic capacitors to be used in electronic instruments and, in particular, to monolithic ceramic capacitors having inner electrodes made of a base metal such as nickel or nickel alloys.

BACKGROUND OF THE INVENTION

In general, ceramic capacitors are produced according to the process mentioned below.

First, a plurality of sheet-like dielectric materials each of which is coated with an electrode material to be an inner electrode are prepared. As the dielectric material, for example, employable is a material consisting essentially of $BaTiO_3$. Next, these sheet-like dielectric materials each coated with such an electrode material are laminated together, pressed under heat to make them integrate, and thereafter fired at from 1250° to 1350° C. in air to give a dielectric ceramic having therein inner electrodes. Next, outer electrodes are attached to the terminals of the dielectric ceramic and electrically connected to the inner electrodes by baking. As a result of this process, a monolithic ceramic capacitor is obtained.

Therefore, the material of such inner electrodes must satisfy the following conditions.

(a) Since the inner electrodes are fired along with the dielectric material, they must have a melting point higher than the temperature at which the dielectric material is fired and (b) The material of the inner electrodes cannot be oxidized even in an oxidizing, high-temperature atmosphere and cannot react with the dielectric material.

As electrodes that satisfy the above-mentioned conditions, there have heretofore been employed noble metals such as platinum, gold, palladium, silver-palladium alloys, etc.

However, these electrode materials are expensive, although they have excellent characteristics. As a result, the proportion of the cost of electrode materials to the total cost in producing monolithic ceramic capacitors reached from 30 to 70%, and, therefore, was the most essential factor in increasing the production costs of such monolithic ceramic capacitors.

Apart from such noble metals, base metals such as Ni, Fe, Co, W, Mo, etc. are known to have a high melting point. However, these base metals are easily oxidized in an oxidizing atmosphere at high temperatures and therefore cannot be used as electrodes in such monolithic ceramic capacitors. Therefore, if these base metals are desired to be used as inner electrodes in monolithic ceramic capacitors, they must be fired in a neutral or reducing atmosphere along with the dielectric material. However, if conventional dielectric materials are fired in such a neutral or reducing atmosphere, they are noticeably reduced and converted into semiconductors.

In order to solve this problem, for example, a dielectric material comprising a solid solution of barium titanate where the ratio of barium sites/titanium sites is more than the stoichiometric ratio, such as that disclosed in Japanese Patent Publication No. 57-42588, and a dielectric material comprising a solid solution of barium titanate with an oxide of a rare earth metal such as La, Nd, Sm, Dy, Y or the like added thereto, such as that disclosed in Japanese Patent Laid-Open No. 61-101459, have been proposed.

In addition, other dielectric materials modified to have a reduced temperature-dependent variation in the dielectric constant have been proposed. As examples, mentioned are the composition of $BaTiO_3$—$CaZrO_3$—MnO-MgO such as that disclosed in Japanese Patent Laid-Open No. 62-256422 and the composition of $BaTiO_3$—(Mg, Zn, Sr, Ca)O-$B_2O_3$—$SiO_2$ such as that disclosed in Japanese Patent Publication No. 61-14611.

By using these dielectric materials, it has become possible to obtain dielectric ceramics that are not converted into semiconductors even when fired in a reducing atmosphere, and the production of monolithic ceramic capacitors having inner electrodes made of base metal such as nickel and the like has been realized.

With recent developments in electronics, small-sized electronic parts have become much more popular, and the tendency toward small-sized, large-capacity monolithic ceramic capacitors has become remarkable.

Given the situation, the development of dielectric materials having an enlarged dielectric constant and also thin dielectric layers is desired. Accordingly, there is a great demand for reliable dielectric materials having a high dielectric constant and having a temperature-dependent variation in the dielectric constant.

However, the dielectric ceramics to be produced from the dielectric materials as disclosed in Japanese Patent Publication No. 57-42588 and Japanese Patent Laid-Open No. 61-101459 comprises large crystal grains, even though the materials have a high dielectric constant. Therefore, if the dielectric ceramics are used to produce thin dielectric layers having a thickness of not larger than 10 μm in monolithic ceramic capacitors, the number of the crystal grains in each dielectric layer is decreased with the result that it is difficult to improve the quality and the reliability of the monolithic ceramic capacitors comprising the layers. In addition, the temperature-dependent variation in the dielectric constant of the dielectric materials is large.

On the other hand, the dielectric material as disclosed in Japanese Patent Laid-Open No. 62-256422 has a relatively high dielectric constant, and the dielectric ceramic to be produced from the material comprises small crystal grains and has a small temperature-dependent variation in the dielectric constant. In the material, however, $CaZr_{12}O_3$ and also $CaTiO_3$ that are formed during baking easily give a secondary phase along with Mn and others. Therefore, it is difficult to improve the reliability of the material at high temperatures.

The dielectric material as disclosed in Japanese Patent Publication No. 61-14611 has a dielectric constant of from 2000 to 2800. Therefore, it is difficult to say that the material is suitable in producing small-sized, large-capacity monolithic ceramic capacitors. In addition, the material does not satisfy the requirement stipulated in EIA Standard, which is such that the variation in the electrostatic capacity of condensers at temperatures falling between −55° C. and +125° C. shall be within ±15%.

In order to make them applicable to automatic surface mounting, small-sized, large-capacity monolithic ceramic capacitors have a plated film of solder or the like over the outer electrodes formed by baking an electroconductive metal powder. Electrolytic plating is generally employed to form such a plated film.

In general, the electrodes to be formed by baking an electroconductive metal powder have fine voids. Therefore, if a monolithic ceramic capacitor with such outer electrodes is dipped in a plating bath so as to form a plated film on the electrodes, the plating liquid penetrates into the electrodes through their voids. As the case may be, the plating liquid often reaches the interface between the inner electrode and the dielectric ceramic layer. For these reasons, the dielectric materials mentioned above are problematic in that their reliability is lowered.

SUMMARY OF THE INVENTION

According to the present invention, there is provided a low-priced, small-sized, large-capacity monolithic ceramic capacitor, which has a dielectric constant of 3000 or more and an insulating resistance of 3000 $\Omega \cdot \mu F$ or more in terms of the product of itself and the electrostatic capacity (CR), of which the temperature-dependence of the electrostatic capacity satisfies the B characteristic in JIS Standard and the X7R characteristic in EIA Standard, and which has high reliability irrespective of the presence or absence of any plated film thereon.

Specifically, the first aspect of the present invention is to provide a monolithic ceramic capacitor comprising a plurality of dielectric ceramic layers, a plurality of inner electrodes disposed throughout the dielectric ceramic layers, and outer electrodes connected with the inner electrodes, which is characterized in that each dielectric ceramic layer is composed of a material comprising an essential component consisting of barium titanate having a content of impurities of alkali metal oxides of not higher than 0.03% by weight, yttrium oxide, nickel oxide, and optionally cobalt oxide to have a composition of $(1-\alpha-\beta)(BaO)_m TiO_2 + \alpha Y_2 O_3 + \beta(Co_{1-x}Ni_x)O$ (where $0.0025 \leq \alpha \leq 0.03$, $0.0025 \leq \beta \leq 0.06$, $0 < \beta/\alpha \leq 6$, $0 < x \leq 1$, $1.000 \leq m \leq 1.035$), and an additional (side) component consisting of from 0.5 to 3.0 mols relative to 100 mols of the essential component and in terms of MgO, of magnesium oxide, and from 0.05 to 2.0 mols relative to 100 mols of the essential component and in terms of MnO, of manganese oxide, and further containing from 0.2 to 3.0 parts by weight, relative to 100 parts by weight of the sum of the main component and the side component, of oxide glass of $Li_2O$—RO—$(Ti,Si)O_2$ (where R indicates at least one of Ba, Sr, Ca and Mg), and each inner electrode is comprises a base metal such as nickel or a nickel alloy. Preferably, $0.005 \leq \alpha \leq 0.023$, $0.005 \leq \beta \leq 0.03$, $0.5 \leq x \leq 1$, $1.01 \leq m \leq 1.02$, and the side component contains 1.2 to 2 mols of magnesium oxide and from 0.4 to 0.7 mols of manganese oxide, and further contains 0.2 to 1 parts by weight of oxide glass.

One embodiment of the first aspect of the invention is such that the oxide glass of $Li_2O$—RO—$(Ti,Si)O_2$ (where R indicates at least one of Ba, Sr, Ca and Mg) has a composition of $Li_2O$—MO—RO—$(Ti,Si)O_2$ (where M indicates at least one of Zn and Mn) provided that $Li_2O$ is from 2 to 45 mol %, MO is from 0 to 40 mol %, RO is from 5 to 40 mol % and $(Ti,Si)O_2$ is from 35 to 70 mol % but with the $SiO_2$ of the $(Ti,Si)O_2$ being not less than 15 mol % and contains not more than 20 parts by weight, relative to 100 parts by weight of the above-mentioned components, of at least one of $Al_2O_3$ and $ZrO_2$ provided that $ZrO_2$ is not more than 10 parts by weight.

Another embodiment of the first aspect of the invention is such that each outer electrode is composed of a sintered layer of an electroconductive metal powder or of a sintered layer of an electroconductive metal powder and a glass frit.

Still another embodiment of the first aspect of the invention is such that each outer electrode is composed of a lower (first) layer and an upper (second) layer where the first layer is a sintered layer of an electroconductive metal powder or a sintered layer of an electroconductive metal layer and a glass frit and the second layer is a plated layer.

The second aspect of the present invention is to provide a monolithic ceramic capacitor comprising a plurality of dielectric ceramic layers, a plurality of inner electrodes disposed in the dielectric ceramic layers, and outer electrodes connected with the inner electrodes, which is characterized in that each dielectric ceramic layer is composed of a material comprising an essential component consisting of barium titanate having a content of impurities of alkali metal oxides of not higher than 0.03% by weight, yttrium oxide, zinc oxide and nickel oxide to have a composition of $(1-\alpha-\beta)(BaO)_m TiO_2 + \alpha Y_2 O_3 + \beta(Zn_{1-x}Ni_x)O$ (where $0.0025 \leq \alpha \leq 0.03$, $0.0025 \leq \beta \leq 0.08$, $0 < \beta/\alpha \leq 8$, $0 < x < 1$, $1.000 \leq m \leq 1.035$) and an additional (side) component consisting of from 0.2 to 2.5 mols relative to 100 mols of the essential component and in terms of MgO, of magnesium oxide, and from 0.05 to 2.0 mols relative to 100 mols of the essential component and in terms of MnO, of manganese oxide, and further containing from 0.2 to 3.0 parts by weight relative to 100 parts by weight of the sum of the main component and the side component, of oxide glass of $Li_2O$—RO—$(Ti,Si)O_2$ (where R indicates at least one of Ba, Sr, Ca and Mg), and each inner electrode is composed of nickel or a nickel alloy. Preferably, $0.004 \leq \alpha \leq 0.025$, $0.005 \leq \beta \leq 0.08$, $0.05 \leq x \leq 1$, $1.005 \leq m \leq 1.02$, and the side component contains 0.6 to 2 mols of magnesium oxide and from 0.4 to 0.7 mols of manganese oxide, and further contains 0.8 to 1.5 parts by weight of oxide glass.

One embodiment of the second aspect of the invention is such that the oxide glass of $Li_2O$—RO—$(Ti,Si)O_2$ (where R indicates at least one of Ba, Sr, Ca and Mg) has a composition of $Li_2O$—MO—RO—$(Ti,Si)O_2$ (where M indicates at least one of Zn and Mn) provided that $Li_2O$ is from 2 to 45 mol %, MO is from 0 to 40 mol %, RO is from 5 to 40 mol % and $(Ti,Si)O_2$ is from 35 to 70 mol % provided the $SiO_2$ of $(Ti,Si)O_2$ is not less than 15 mol % and contains not more than 20 parts by weight, relative to 100 parts by weight of the above-mentioned components, of at least one of $Al_2O_3$ and $ZrO_2$ provided that $ZrO_2$ is not more than 10 parts by weight.

Another embodiment of the second aspect of the invention is such that each outer electrode is composed of a sintered layer of an electroconductive metal powder or of a sintered layer of an electroconductive metal powder and a glass frit.

Still another embodiment of the first aspect of the invention is such that each outer electrode is composed of a lower (first) layer and an upper (second) layer where the first layer is a sintered layer of an electroconductive metal powder or a sintered layer of an electroconductive metal layer and a glass frit and the second layer is a plated layer.

DETAILED DESCRIPTION OF EMBODIMENTS OF THE INVENTION

Figure 1:
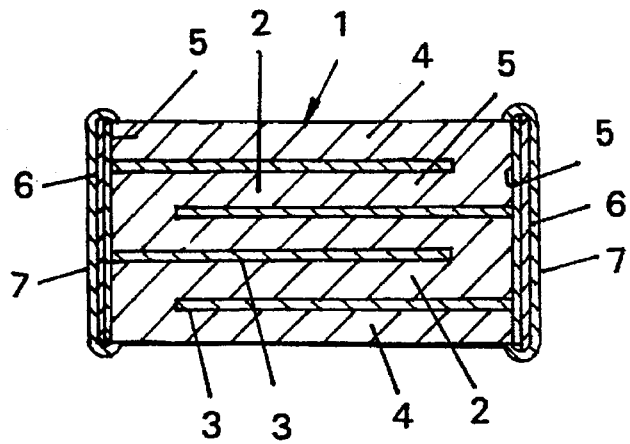
FIG. 1 is a cross-sectional view showing one embodiment of the monolithic ceramic capacitor of the invention.

According to the first aspect of the present invention, the dielectric ceramic composition which is used as the material of the dielectric ceramic layers constituting the monolithic ceramic capacitor of the invention comprises barium titanate, yttrium oxide, cobalt oxide and nickel oxide at a predetermined compositional ratio and contains magnesium oxide, manganese oxide and oxide glass of $Li_2O$—$RO$—$(Ti,Si)O_2$ (where R indicates at least one of Ba, Sr, Ca and Mg). Therefore, the composition can be fired and sintered even in a reducing atmosphere without worsening its characteristics. In addition, since the sintered product from the composition comprises small crystal grains having a grain size of not larger than 1 µm, the number of the crystal grains in each dielectric layer made of the sintered product is increased. Therefore, even if the thickness of the dielectric layers constituting the monolithic ceramic capacitor is reduced, the reliability of the condenser is not lowered.

In the first aspect of the invention, the essential component constituting the dielectric ceramic composition, from which the dielectric ceramic layer is formed, comprises barium titanate, yttrium oxide, cobalt oxide and nickel oxide. If the barium titanate in the composition contains, as impurities, alkaline earth metal oxides such as SrO, CaO, etc., alkali metal oxides such as $Na_2O$, $K_2O$, etc. and also other oxides of $Al_2O_3$, $SiO_2$, etc., especially alkali metal oxides of $Na_2O$, $K_2O$, and the like, the content of such impurities has a great negative influence on the electric characteristics of a condenser comprising the dielectric ceramic layers. According to the present invention, therefore, the content of alkali metal oxides existing in the barium titanate as impurities is controlled to be not more than 0.03% by weight, whereby it is possible to make the condenser of the invention have a dielectric constant of not lower than 3000.

By adding oxide glass of $Li_2O$—$RO$—$(Ti,Si)O_2$ to the dielectric ceramic layer, the sinterability of the layer is improved and the plating resistance of the sintered layer is also improved. Further, by adding $Al_2O_3$ and $ZrO_2$ to the oxide glass of $Li_2O$—$RO$—$(Ti,Si)O_2$, the ceramic layer can have a much increased insulating resistance.

According to the second aspect of the present invention, the dielectric ceramic composition which is used as the material of the dielectric ceramic layers constituting the monolithic ceramic capacitor of the invention comprises barium titanate, yttrium oxide, zinc oxide and nickel oxide at a predetermined compositional ratio and contains magnesium oxide, manganese oxide and oxide glass of $Li_2O$—$RO$—$(Ti,Si)O_2$ (where R indicates at least one of Ba, Sr, Ca and Mg). Therefore, the composition can be fired and sintered even in a reducing atmosphere without worsening its characteristics. In addition, since the sintered product from the composition comprises small crystal grains having a grain size of not larger than 1 µm, the number of the crystal grains in each dielectric layer made of the sintered product is increased. Therefore, even if the thickness of the dielectric layers constituting the monolithic ceramic capacitor is reduced, the reliability of the condenser is not lowered.

Preferred embodiments of the present invention will be described hereinunder by means of the examples mentioned below and with reference to the drawings attached hereto.

As shown in FIG. 1, the monolithic ceramic capacitor of the present invention may be in the form of a rectangular parallelepiped chip comprising a laminate dielectric ceramic 1 obtained by laminating a plurality of dielectric ceramics 2 and inner electrodes 3, and comprising as outer electrodes 5, plated films 6 of nickel, copper or the like and plated films 7 of solder, tin or the like all formed at the both sides of the ceramic 1.

A process for producing the monolithic ceramic capacitor is mentioned below.

Figure 2:
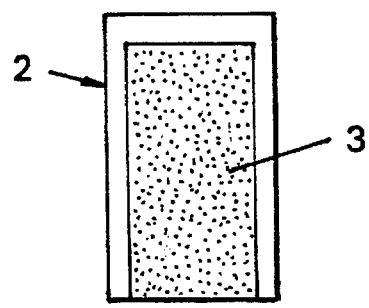
FIG. 2 is a plan view showing one embodiment of the non-laminated dielectric ceramic to be in the condenser of the invention.
Figure 3:
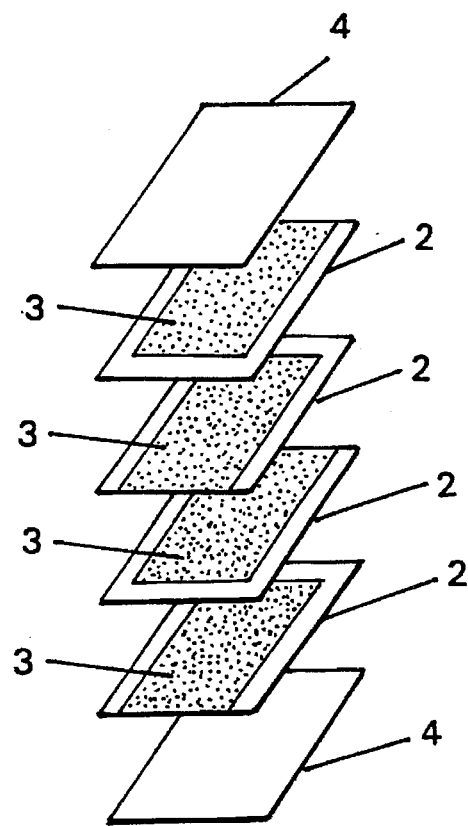
FIG. 3 is a perspective view showing a plurality of the dielectric ceramics of FIG. 2 to be laminated.

First, the laminate dielectric ceramic 1 is formed in the following manner. As shown in FIG. 2, a green sheet is prepared by shaping a slurry that has been formed from a powdery mixture comprising barium titanate, yttrium oxide, cobalt oxide, nickel oxide, magnesium oxide, and manganese oxide or barium titanate, yttrium oxide, zinc oxide, nickel oxide, magnesium oxide, and manganese oxide and oxide glass of $Li_2O$—$RO$—$(Ti,Si)O_2$ (where R indicates at least one of Ba, Sr, Ca and Mg). This is the dielectric ceramic 2. On one surface of the sheet is formed the inner electrode 3 made of nickel or a nickel alloy. To form the inner electrode 3, employable is screen printing, chemical vapor deposition, plating or the like.

Next, a necessary number of the dielectric ceramics 2 each having the inner electrode 3 are laminated and pressed between a pair of dielectric ceramics 4 having no inner electrode 3 to form a laminate. This is fired in a reducing atmosphere at a pre-determined temperature to obtain the laminate dielectric ceramic 1. Next, two outer electrodes 5 are formed at the sides of the laminate dielectric ceramic 1 in such a way that these are connected with the inner electrodes 3. The material of these outer electrodes 5 may be the same as that of the inner electrodes 3. Apart from this, also employable are silver, palladium, silver-palladium alloys, copper, copper alloys, etc. as well as mixtures comprising any of these metal powders and glass frit. Suitable materials shall be selected in consideration of the use of the monolithic ceramic capacitor and the place where it is used. The outer electrodes 5 are formed by applying a raw material paste prepared from a metal powder to the fired laminate dielectric ceramic 1, followed by firing the paste. If desired, however, the paste may be applied to the non-fired laminate dielectric ceramic 1 and then fired. In the latter instance, the laminate dielectric ceramic 1 with the outer electrodes 5 is formed by one baking. After this, the outer electrodes 5 are plated with copper or the like to form the plated films 6 thereon. Finally, the plated films 6 are again plated with solder, tin or the like to form the plated films 7 thereon. As a result of this process, a chip-type monolithic ceramic capacitor is obtained.

EXAMPLE 1

As raw materials, prepared and weighed were $TiCl_4$ and $Ba(NO_3)_2$ having various degrees of purity. Next, these were treated with oxalic acid to form a precipitate of barium titanyl oxalate $(BaTiO(C_2O_4) \cdot 4H_2O)$. The precipitate was then pyrolyzed at a temperature not lower than 1000° C. to produce four types of barium titanate $(BaTiO_3)$ as shown in Table 1. The corresponding oxides, carbonates or hydroxides were weighed at a compositional ratio of $0.19Li_2O$–$0.06MnO$–$0.14BaO$–$0.06CaO$–$0.07TiO_2$–$0.48SiO_2$ (by mol), mixed, ground, vaporized and dried to obtain a powdery mixture. Then, the powdery mixture was kept in an alumina crucible at 1300° C. for one hour and then rapidly cooled to obtain oxide glass having a mean grain size of not larger than 1 µm.

Next, $BaCO_3$ and $TiO_2$, which are to control the molar ratio of Ba/Ti of barium titanate, as well as $Y_2O_3$, CoO, NiO, MgO and MnO each having a purity of 99% or more were prepared.

These raw material powders and the $BaTiO_3$ and oxide glass as previously prepared were mixed at the compositional ratio shown in Table 2, to which were added a polyvinyl butyral binder and an organic solvent such as ethanol or the like. These were then wet-milled in a ball mill to prepare a ceramic slurry. After this, the ceramic slurry was shaped into a sheet using a doctor blade. Thus obtained was a rectangular ceramic green sheet having a thickness of 14 μm. Next, an electroconductive paste consisting essentially of Ni was printed on the ceramic green sheet to form thereon an electroconductive paste layer to be an inner electrode.

Next, a plurality of the ceramic green sheets each having the electroconductive paste layer thereon were laminated with alternating the side completely covered by the paste layer and the side not covered by the paste layer. The resulting laminate was heated at 350° C. in an $N_2$ atmosphere to burn the binder and then fired in a reducing atmosphere comprising a mixed gas of $H_2$—$N_2$—$H_2O$ having an oxygen partial pressure of from $10^{-9}$ to $10^{-11}$ MPa for 2 hours at the temperature shown in Table 3. Thus was obtained a sintered laminate ceramic.

After this, the surface of the sintered laminate ceramic was observed with a scanning electronic microscope at a magnification of 1500 to determine the grain size of the grains existing in the surface.

Finally, the both sides of the sintered laminate ceramic were coated with a silver paste to which had been added a barium borosilicate glass frit. Then this was fired in an $N_2$ atmosphere at 600° C. to form outer electrodes connected with the inner electrodes. Thus were obtained various monolithic ceramic capacitors.

The outer dimension of each monolithic ceramic capacitor produced herein was such that the width was 1.6 mm, the length was 3.2 mm and the thickness was 1.2 mm. The thickness of one dielectric ceramic layer existing between the inner electrodes was 10 μm. The total number of the effective dielectric ceramic layers in the condenser was 19, and the area of the facing electrodes per one layer was 2.1 $mm^2$.

Next, the electrostatic capacity (C) and the dielectric loss (tan δ) of each condenser were measured, using an automatic bridge-type meter, at a frequency of 1 kHz, at 1 Vrms and at 25° C. From the electrostatic capacity thus measured, derived was the dielectric constant ($\epsilon$) by calculation. In addition, using an insulating resistance meter, the insulating resistance (R) of each condenser was measured at 25° C. and at 125° C. while applying thereto a direct-current voltage of 16 V for 2 minutes. Thus was obtained the product (CR) of the electrostatic capacity (C) and the insulating resistance (R).

Next, the temperature-dependent variation in the electrostatic capacity of each condenser was measured. Precisely, obtained were the difference in the electrostatic capacity between $-25°$ C. and 85° C. on the basis of the electrostatic capacity at 20° C. ($\Delta C/C_{20° C.}$), the difference in the electrostatic capacity between $-55°$ C. and 125° C. on the basis of the electrostatic capacity at 25° C. ($\Delta C/C_{25° C.}$), and the absolute maximum variation in the electrostatic capacity between $-55°$ C. and 125° C. ($|\Delta C|_{max}$).

Next, 36 samples of each condenser were subjected to a high-temperature-load life test, by applying thereto a direct-current voltage of 150 V at 150° C., whereupon the time-dependent variation in the insulating resistance of each sample was measured. In this test, the time at which the insulating resistance (R) of each sample became $106\Omega$ was referred to as the life time of each sample, and the average of all the tested samples was obtained.

The results obtained are shown in Tables 3 and 4.

As is obvious from Tables 2, 3 and 4, the monolithic ceramic capacitor samples of the present invention have a high dielectric constant ($\epsilon$) of not lower than 3000 and a dielectric loss (tan δ) of not higher than 2.5%. Regarding the temperature-dependent variation in the electrostatic capacity, the samples of the present invention all satisfy the B characteristic stipulated in JIS Standard within the range between $-25°$ C. and 85° C. (in that the variation in the electrostatic capacity shall fall within ±10%) and the X7R characteristic stipulated in EIA Standard within the range between $-55°$ C. and 125° C. (in that the variation in the electrostatic capacity shall fall within ±15%).

In addition, the values of insulating resistance at 25° C. and 125° C., in terms of the product CR of the samples of the present invention are high, being not lower than 3000 MΩ·μF and not lower than 500 MΩ·μF, respectively. Further, the mean life time of the samples of the present invention is long (not shorter than 250 hours).

Moreover, the ceramic sheets of the present invention could be sintered at relatively low temperatures of not higher than 1300° C., and the grains existing in the sintered ceramics were small to have a grain size of not larger than 1 μm.

The reasons for defining the composition of the ceramic layer according to the first aspect of the present invention are mentioned below with reference to the samples produced herein.

The composition is defined to be $(1-\alpha-\beta)(BaO)_m TiO_2 + \alpha Y_2O_3 + \beta(Co_{1-x}Ni_x)O$. If the proportion ($\alpha$) of $Y_2O_3$ is less than 0.0025 as in sample No. 1-1, the dielectric constant ($\epsilon$) is lower than 3000, the dielectric loss (tan δ) is larger than 2.5%, and the temperature-dependent variation in the electrostatic capacity is large. In addition, the mean life time is extremely shortened, and the grain size of the grains existing in the ceramic layer is larger than 1.0 μm so that the dielectric layer cannot be thinned. On the other hand, if the proportion ($\alpha$) of $Y_2O_3$ is more than 0.03 as in sample No. 1-17, the dielectric constant ($\epsilon$) is lower than 3000, the insulating resistance at 25° C. and 125° C. is lowered, and the mean life time is short. In addition, the sintering temperature must be high.

If the proportion ($\beta$) of $(Co_{1-x}Ni_x)O$ is less than 0.0025 as in sample No. 1-2, the dielectric loss (tan δ) is larger than 2.5, the insulating resistance at 25° C. and 125° C. is lowered, and the mean life time is short. In addition, the temperature-dependent variation in the electrostatic capacity is large so that the condenser cannot satisfy the B characteristic of the JIS Standard and the X7R characteristic of the EIA Standard. On the other hand, if the proportion ($\beta$) of $(Co_{1-x}Ni_x)O$ is more than 0.06 as in sample No. 1-18, the insulating resistance at 125° C. is lower than 500 MΩ·μF, and the mean life time is shorter than 250 hours. If the proportion (x) of Ni in $(Co_{1-x}Ni_x)O$ is 0 (zero) as in sample No. 1-3, the insulating resistance at 125° C. is lower than 500 MΩ·μF, and the mean life time is shorter than 250 hours.

If the ratio of the proportion ($\beta$) of $(Co_{1-x}Ni_x)O$ to the proportion ($\alpha$) of $Y_2O_3$, $\beta/\alpha$ is larger than 6 as in sample No. 1-19, the temperature-dependent variation in the electrostatic capacity is unfavorably large. Therefore, $\beta/\alpha$ is 6 or less, more preferably $\frac{1}{3} \leq \beta/\alpha \leq 3$.

If the molar ratio (m) of barium titanate is less than 1.000 as in sample 1-4, the ceramic is reduced when fired in a reducing atmosphere, and converted into a semiconductor with the result that its insulating resistance is lowered. On the other hand, if the molar ratio (m) in question is more than 1.035 as in sample No. 1-20, the sinterability of the ceramic is noticeably worsened.

If the amount of MgO is less than 0.5 mols as in sample No. 1-5, the insulating resistance at 125° C. is lower than 500 MΩ·μF. and the mean life time is shorter than 250 hours. In addition, the temperature-dependent variation in the electrostatic capacity does not satisfy the B characteristic of the JIS Standard though satisfying the X7R characteristic of the EIA Standard. On the other hand, if the amount of MgO is more than 3.0 mols as in sample No. 1-21, the dielectric constant is lower than 3000, and the insulating resistance is lowered.

If the amount of MnO is less than 0.05 mols as in sample No. 1-6, the insulating resistance at 25° C. and 125° C. is lowered, and the mean life time is short. On the other hand, if the amount of MnO is more than 2.0 mols as in sample No. 1-22, the insulating resistance at 125° C. is lowered and the mean life time is short.

If the amount of the oxide glass is less than 0.2 parts by weight as in sample No. 1-7, the sintering temperature must be high, the insulating resistance is lowered and the mean life time is extremely short. On the other hand, if the amount of the oxide glass is more than 3.0 parts by weight as in sample No. 1-23, the dielectric constant is lower than 3000, and the temperature-dependent variation in the electrostatic capacity is unfavorably large.

If the content of alkali metal impurities in the barium titanate is more than 0.03% by weight as in sample No. 1-24, the dielectric constant is unfavorably lowered.

EXAMPLE 2

Barium titanate A in Table 1 was used herein. The corresponding raw materials were mixed to prepare a dielectric powder comprising $98.2(BaO)_{1.010}TiO_2+0.6Y_2O_3+1.2NiO$ (by mol) to which had been added 1.2 mols of MgO and 0.2 mols of MnO. To this was added the oxide glass having the composition shown in Table 5 and having a mean grain size of not larger than 1 μm. In the same manner as in Example 1 but using the mixture as prepared herein, monolithic ceramic capacitors each having outer electrodes comprising silver and glass frit and electrically connected with inner electrodes were produced.

The outer dimension of each condenser produced herein and the thickness of each dielectric ceramic layer in the condenser were the same as those in Example 1.

The electric characteristics of the condenser samples produced herein were measured. Concretely, the electrostatic capacity (C) and the dielectric loss (tan δ) of each condenser were measured using an automatic bridge-type meter at a frequency of 1 kHz, at 1 Vrms and at 25° C. From the electrostatic capacity thus measured, derived was the dielectric constant (ε) by calculation. In addition, using an insulating resistance meter, the insulating resistance (R) of each condenser was measured at 25° C. and at 125° C. while applying thereto a direct-current voltage of 16 V for 2 minutes. Thus was obtained the product (CR) of the electrostatic capacity (C) and the insulating resistance (R).

Next, the temperature-dependent variation in the electrostatic capacity of each condenser was measured. Precisely, obtained were the difference in the electrostatic capacity between −25° C. and 85° C. on the basis of the electrostatic capacity at 20° C. ($\Delta C/C_{20°\,C.}$), the difference in the electrostatic capacity between −55° C. and 125° C. on the basis of the electrostatic capacity at 25° C. ($\Delta C/C_{20°\,C.}$), and the absolute maximum variation in the electrostatic capacity between −55° C. and 125° C. ($\Delta C/C_{20°\,C.}$/max).

After these were measured, a nickel plating bath consisting essentially of nickel sulfate, nickel chloride and boric acid was prepared. Using the plating bath, the outer silver electrodes of each condenser were plated with nickel by barrel plating. Finally, a solder plating bath comprising AS (alkanol-sulfonic acid bath) was prepared. Using this, the nickel-plated films were further plated with the solder film also by barrel plating. Thus were obtained monolithic ceramic capacitors each having the plated layers on the outer electrodes.

The electrostatic capacity (C) of each condenser thus produced was measured using an automatic bridge-type meter at a frequency of 1 kHz, at 1 Vrms and at 25° C. In addition, using an insulating resistance meter, the insulating resistance (R) of each condenser was measured at 25° C. and at 125° C. while applying thereto a direct-current voltage of 16 V for 2 minutes. Thus was obtained the product (CR) of the electrostatic capacity (C) and the insulating resistance (R).

The results obtained in the above are shown in Tables 6 and 7.

As is obvious from Tables 5, 6 and 7, the monolithic ceramic capacitor samples of the present invention each having the laminated ceramic layers containing the oxide glass within the scope of the present invention have a high dielectric constant (ε) of not lower than 3000 and a dielectric loss (tan δ) of not higher than 2.5%. Regarding the temperature-dependent variation in the electrostatic capacity, the samples of the present invention all satisfy the B characteristic as stipulated in JIS Standard within the range between −25° C. and 85° C. and the X7R characteristic as stipulated in EIA Standard within the range between −55° C. and 125° C. Even after plated, the electric characteristics of the samples of the present invention are not worsened.

As opposed to these, the monolithic ceramic capacitors not falling within the scope of the present invention in that the constitutive dielectric ceramic layers do not contain the oxide glass having the composition as defined in the present invention are as follows:

If the dielectric ceramic layers do not contain the oxide glass of $Li_2O$—MO—RO—$(Ti,Si)O_2$ as in sample No. 2-1, the sintering temperature must be high and the insulating resistance is lowered. In addition, the insulating resistance is further lowered due to plating.

If the amount of $Li_2O$ is less than 2 mol % as in sample No. 2-2, the sintering temperature must be higher than 1300° C., the dielectric loss (tan δ) is larger than 2.5%, and the temperature-dependent variation in the electrostatic capacity is large. On the other hand, if the amount of $Li_2O$ is more than 40 mol % as in sample No. 2-16, the dielectric ceramic layers are unfavorably delaminated.

If the amount of MO is more than 40 mol % as in sample No. 2-15, the sintering temperature must be high and the dielectric constant is lower than 3000.

If the amount of RO is less than 5 mol % as in sample No. 2-3, the sintering temperature must be higher than 1300° C. If, on the other hand, the amount of RO is more than 40 mol % as in sample No. 2-17, the sintering temperature must also be high and, in addition, the dielectric constant is lower than 3000. Further, the insulating resistance is slightly lowered due to plating.

If the amount of $(Ti,Si)O_2$ is less than 35 mol % as in sample No. 2-4, the sintering temperature must be high, and the insulating resistance is greatly lowered due to plating. On the other hand, if the amount of (Ti,Si) $O_2$ is more than 70 mol % as in sample No. 2-18, the sintering temperature must be unfavorably high. If the amount of $SiO_2$ is less than 15 mol % as in sample No. 2-5, the sintering temperature must be high, and the insulating resistance is greatly lowered due to plating. On the other hand, if the amount of $TiO_2$ is 0 (zero) as in sample No. 2-6, such is unfavorable since the insulating resistance is greatly lowered due to plating.

By adding $Al_2O_3$ and $ZrO_2$ to the oxide glass of $Li_2O$—MO—RO—$(Ti,Si)O_2$, obtained are monolithic ceramic capacitors having an insulating resistance at 25° C. and 125° C. of not lower than 5000 MΩ·µF. and not lower than 1000 MΩ·µF., respectively, such as sample Nos. 2-12 to 2-14. However, if the amount of $Al_2O_3$ is more than 20% by weight as in sample No. 2-19, or if the amount of $ZrO_2$ is more than 10 parts by weight as in sample No. 2-20, the sinterability is lowered, the dielectric constant is less than 3000, and the insulating resistance is unfavorably lowered. In addition, the insulating resistance is greatly lowered due to plating.

EXAMPLE 3

As raw materials, prepared and weighed were $TiCl_4$ and $Ba(NO_3)_2$ having various degrees of purity. Next, these were treated with oxalic acid to form a precipitate of barium titanyl oxalate $(BaTiO(C_2O_4).4H_2O)$. The precipitate was then pyrolyzed at a temperature not lower than 1000° C. to produce four types of barium titanate $(BaTiO_3)$ as shown in Table 1. The corresponding oxides, carbonates or hydroxides were weighed at a compositional ratio of $0.24Li_2O-0.06MnO-0.14BaO-0.06CaO-0.03TiO_2-0.47SiO_2$ (by mol), mixed, ground, vaporized and dried to obtain a powdery mixture. Then, the powdery mixture was kept in an alumina crucible at 1300° C. for one hour and then rapidly cooled to obtain oxide glass having a mean grain size of not larger than 1 µm.

Next, $BaCO_3$ and $TiO_2$, which are to control the molar ratio of Ba/Ti of barium titanate, as well as $Y_2O_3$, ZnO, NiO, MgO and MnO each having a purity of 99% or more were prepared.

These raw material powders and the $BaTiO_3$ and oxide glass as previously prepared were mixed at the compositional ratio shown in Table 8, to which were added a polyvinyl butyral binder and an organic solvent such as ethanol or the like. These were then wet-milled in a ball mill to prepare a ceramic slurry. After this, the ceramic slurry was shaped into a sheet using a doctor blade. Thus obtained was a rectangular ceramic green sheet having a thickness of 14 µm. Next, an electroconductive paste consisting essentially of Ni was printed on the ceramic green sheet to form thereon an electroconductive paste layer to be an inner electrode.

Next, a plurality of the ceramic green sheets each having the electroconductive paste layer thereon were laminated with alternating the side completely covered by the paste layer and the side not covered by the paste layer. The resulting laminate was heated at 350° C. in an $N_2$ atmosphere to burn the binder and then fired in a reducing atmosphere comprising a mixed gas of $H_2$—$N_2$—$H_2O$ having an oxygen partial pressure of from $10^{-9}$ to $10^{-11}$ MPa for 2 hours at the temperature shown in Table 9. Thus was obtained a sintered laminate ceramic.

After this, the surface of the sintered laminate ceramic was observed with a scanning electronic microscope at a magnification of 1500 to determine the grain size of the grains existing in the surface.

Finally, the both sides of the sintered laminate ceramic were coated with a silver paste to which had been added barium borosilicate glass frit. Then this was fired in an $N_2$ atmosphere at 600° C. to form outer electrodes connected with the inner electrodes. Thus were obtained various monolithic ceramic capacitors.

The outer dimension of each monolithic ceramic capacitor produced herein was such that the width was 1.6 mm, the length was 3.2 mm and the thickness was 1.2 mm. The thickness of one dielectric ceramic layer existing between the inner electrodes was 10 µm. The total number of the effective dielectric ceramic layers in the condenser was 19, and the area of the facing electrodes per one layer was 2.1 $mm^2$.

Next, the electrostatic capacity (C) and the dielectric loss (tan δ) of each condenser were measured using an automatic bridge-type meter at a frequency of 1 kHz, at 1 Vrms and at 25° C. From the electrostatic capacity thus measured, derived was the dielectric constant (∈) by calculation. In addition, using an insulating resistance meter, the insulating resistance (R) of each condenser was measured at 25° C. and at 125° C. while applying thereto a direct-current voltage of 16 V for 2 minutes. Thus was obtained the product (CR) of the electrostatic capacity (C) and the insulating resistance (R).

Next, the temperature-dependent variation in the electrostatic capacity of each condenser was measured. Precisely, obtained were the difference in the electrostatic capacity between −25° C. and 85° C. on the basis of the electrostatic capacity at 20° C. ($\Delta C/C_{25° C.}$), the difference in the electrostatic capacity between −55° C. and 125° C. on the basis of the electrostatic capacity at 25° C. ($\Delta C/C_{25° C.}$), and the absolute maximum variation in the electrostatic capacity between −55° C. and 125° C. ($/\Delta C/_{max}$).

Next, 36 samples of each condenser were subjected to a high-temperature-load life test by applying thereto a direct-current voltage of 150 V at 150° C., whereupon the time-dependent variation in the insulating resistance of each sample was measured. In this test, the time at which the insulating resistance (R) of each sample became 106Ω was referred to as the life time of each sample, and the average of all the tested samples was obtained.

The results obtained are shown in Tables 9 and 10.

As is obvious from Tables 8, 9 and 10, the monolithic ceramic capacitor samples of the present invention have a high dielectric constant (∈) of not lower than 3000 and a dielectric loss (tan δ) of not higher than 2.5%. Regarding the temperature-dependent variation in the electrostatic capacity, the samples of the present invention all satisfy the B characteristic as stipulated in JIS Standard within the range between −25° C. and 85° C. (in that the variation in the electrostatic capacity shall fall within ±10%) and the X7R characteristic as stipulated in EIA Standard within the range between −55° C. and 125° C. (in that the variation in the electrostatic capacity shall fall within ±15%).

In addition, the values of insulating resistance at 25° C. and 125° C., in terms of the product of CR, of the samples of the present invention are high, being not lower than 3000 MΩ·µF. and not lower than 500 MΩ·µF., respectively. Further, the mean life time of the samples of the present invention is long or is not shorter than 250 hours.

Moreover, the ceramic sheets of the present invention could be sintered at relatively low temperatures of not higher than 1300° C., and the grains existing in the sintered ceramics were small to have a grain size of not larger than 1 µm.

The reasons for defining the composition of the ceramic layer according to the second aspect of the present invention are mentioned below with reference to the samples produced herein.

The composition is defined to be $(1-\alpha-\beta)(BaO)_m TiO_2 + \alpha Y_2O_3 + \beta(Zn_{1-x})O$. If the proportion (α) of $Y_2O_3$ is less than 0.0025 as in sample No. 10-1, the dielectric constant (ε) is lower than 3000, the dielectric loss (tan δ) is larger than 2.5%, and the temperature-dependent variation in the electrostatic capacity is large. In addition, the mean life time is extremely shortened, and the grain size of the grains existing in the ceramic layer is larger than 1.0 μm so that the dielectric layer cannot be thinned.

On the other hand, if the proportion (α) of $Y_2O_3$ is more than 0.03 as in sample No. 10-17, the dielectric constant (ε) is lower than 3000, the insulating resistance at 25° C. and 125° C. is lowered, and the mean life time is short. In addition, the sintering temperature must be high.

If the proportion (β) of $(Zn_{1-x}Ni_x)O$ is less than 0.0025 as in sample No. 10-2, the dielectric loss (tan δ) is larger than 2.5, the insulating resistance at 25° C. and 125° C. is lowered, and the mean life time is short. In addition, the temperature-dependent variation in the electrostatic capacity is large so that the condenser cannot satisfy the B characteristic of JIS Standard and the X7R characteristic of EIA Standard. On the other hand, if the proportion (β) of $(Zn_{1-x}Ni_x)O$ is more than 0.08 as in sample No. 10-18, the insulating resistance at 125° C is lower than 500 MΩ·μF., and the mean life time is shorter than 250 hours. If the proportion (x), of Ni in $(Zn_{1-x}Ni_x)O$ is 0 (zero) as in sample No. 10-3, the sintering temperature must be higher than 1300° C., and the dielectric resistance is unfavorably less than 3000. On the other hand, if the proportion (x) of Ni is 1 (one) and if the proportion (β) of $(Zn_{1-x}Ni_x)O$ is more than 0.06 as in sample No. 10-8, the temperature-dependent variation in the electrostatic capacity is too large so that the condenser does not satisfy the X7R characteristic of EIA Standard.

If the ratio of the proportion (β) of $(Zn_{1-x}Ni_x)O$ to the proportion (α) of $Y_2O_3$, β/α, is larger than 8 as in sample No. 10-19, the temperature-dependent variation in the electrostatic capacity is unfavorably large. Therefore, β/α is 8 or less, more preferably ¼≦β/α≦4.

If the molar ratio (m) of barium titanate is less than 1.000 as in sample 104, the ceramic is reduced when fired in a reducing to and converted into a semiconductor with the result that its insulating resistance is lowered. On the other hand, if the molar ratio (m) in question is more than 1.035 as in sample No. 10-20, the sinterability of the ceramic is noticeably worsened.

If the amount of MgO is less than 0.2 mols as in sample No. 10-5, the insulating resistance at 125° C. is lower than 500 MΩ·μF. and the mean life time is shorter than 250 hours. In addition, the temperature-dependent variation in the electrostatic capacity does not satisfy the B characteristic of JIS Standard though satisfying the X7R characteristic of EIA Standard. On the other hand, if the amount of MgO is more than 2.5 mols as in sample No. 10-21, the sintering temperature must be high, the dielectric constant is lower than 3000, and the insulating resistance is lowered.

If the amount of MnO is less than 0.05 mols as in sample No. 10-6, the insulating resistance at 25° C. and 125° C. is lowered, and the mean life time is short. On the other hand, if the amount of MnO is more than 2.0 mols as in sample No. 10-22, the insulating resistance at 125° C. is lowered and the mean life time is short.

If the amount of the oxide glass is less than 0.2 parts by weight as in sample No. 10-7, the sintering temperature must be high, the insulating resistance is lowered and the mean life time is extremely short. On the other hand, if the amount of the oxide glass is more than 3.0 parts by weight as in 10-23, the dielectric constant is lower than 3000, and the temperature-dependent variation in the electrostatic capacity is unfavorably large.

If the content of alkali metal impurities in the barium titanate is more than 0.03% by weight as in sample No. 10-24, the dielectric constant is unfavorably lowered.

EXAMPLE 4:

Barium titanate A in Table 1 was used herein. The corresponding raw materials were mixed to prepare a dielectric powder comprising $97.9(BaO)_{1.010}TiO_2+0.7Y_2O_3+0.7NiO$ (by mol) to which had been added 1.2 mols of MgO and 0.35 mols of MnO. To this was added the oxide glass having the composition shown in Table 11 and having a mean grain size of not larger than 1 μm. In the same manner as in Example 1 but using the mixture as prepared herein, monolithic ceramic capacitors each having outer electrodes comprising silver and glass frit and electrically connected with inner electrodes were produced.

The outer dimension of each condenser produced herein and the thickness of each dielectric ceramic layer in the condenser were the same as those in Example 3.

The electric characteristics of the condenser samples produced herein were measured. Concretely, the electrostatic capacity (C) and the dielectric loss (tan δ) of each condenser were measured using an automatic bridge-type meter at a frequency of 1 kHz, at 1 Vrms and at 25° C. From the electrostatic capacity thus measured, derived was the dielectric constant (ε) by calculation. In addition, using an insulating resistance meter, the insulating resistance (R) of each condenser was measured at 25° C. and at 125° C. while applying thereto a direct-current voltage of 16 V for 2 minutes. Thus was obtained the product (CR) of the electrostatic capacity (C) and the insulating resistance (R).

Next, the temperature-dependent variation in the electrostatic capacity of each condenser was measured. Precisely, obtained were the difference in the electrostatic capacity between −25° C. and 85° C. on the basis of the electrostatic capacity at 20° C. ($\Delta C/C_{20° C.}$), the difference in the electrostatic capacity between −55° C. and 125° C. on the basis of the electrostatic capacity at 25° C. ($\Delta C/C_{25° C.}$), and the absolute maximum variation in the electrostatic capacity between −55° C. and 125° C. ($/\Delta C/_{max}$).

After these were measured, a nickel plating bath consisting essentially of nickel sulfate, nickel chloride and boric acid was prepared. Using the plating bath, the outer silver electrodes of each condenser were plated with nickel by barrel plating. Finally, a solder plating bath comprising AS (alkanol-sulfonic acid bath) was prepared. Using this, the nickel-plated films were further plated with the solder film also by barrel plating. Thus were obtained monolithic ceramic capacitors each having the plated layers on the outer electrodes.

The electrostatic capacity (C) of each condenser thus produced was measured, using an automatic bridge-type meter at a frequency of 1 kHz, at 1 Vrms and at 25° C. In addition, using an insulating resistance meter, the insulating resistance (R) of each condenser was measured at 25° C. and at 125° C. while applying thereto a direct-current voltage of 16 V for 2 minutes. Thus was obtained the product (CR) of the electrostatic capacity (c) and the insulating resistance (R).

The results obtained in the above are shown in Tables 12 and 13.

As is obvious from Tables 11, 12 and 13, the monolithic ceramic capacitor samples of the present invention each having the laminated ceramic layers containing the oxide glass within the scope of the present invention have a high dielectric constant ($\epsilon$) of not lower than 3000 and a dielectric loss (tan $\delta$) of not higher than 2.5%. Regarding the temperature-dependent variation in the electrostatic capacity, the samples of the present invention all satisfy the B characteristic as stipulated in JIS Standard within the range between −25° C. and 85° C. and the X7R characteristic as stipulated in EIA Standard within the range between −55° C. and 125° C. Even after being plated, the electric characteristics of the samples of the present invention are not worsened.

As opposed to these, the monolithic ceramic capacitors not falling within the scope of the present invention in that the constitutive dielectric ceramic layers do not contain the oxide glass having the composition as defined in the present invention are as follows:

If the dielectric ceramic layers do not contain the oxide glass of $Li_2O$—MO—RO—$(Ti,Si)O_2$ as in sample No. 20-1, the sintering temperature must be high and the insulating resistance is lowered. In addition, the insulating resistance is further lowered due to plating.

If the amount of $Li_2O$ is less than 2 mol % as in sample No. 20-2, the sintering temperature must be higher than 1300° C., the dielectric loss (tan $\delta$) is larger than 2.5%, and the temperature-dependent variation in the electrostatic capacity is large. On the other hand, if the amount of $Li_2O$ is more than 45 mol % as in sample No. 20-16, the dielectric ceramic layers are unfavorably delaminated.

If the amount of MO is more than 40 mol % as in sample No. 20-15, the sintering temperature must be high and the dielectric constant is lower than 3000.

If the amount of RO is less than 5 mol % as in sample No. 20-3, the sintering temperature must be higher than 1300° C. If, on the other hand, the amount of RO is more than 40 mol % as in sample No. 20-17, the sintering temperature must also be high and, in addition, the dielectric constant is lower than 3000. Further, the insulating resistance is lowered due to plating.

If the amount of $(Ti,Si)O_2$ is less than 35 mol % as in sample No. 20-4, the sintering temperature must be high, and the insulating resistance is greatly lowered due to plating. On the other hand, if the amount of $(Ti,Si)O_2$ is more than 70 mol % as in sample No. 20-18, the sintering temperature must be unfavorably high. If the amount of $SiO_2$ is less than 15 mol % as in sample No. 20-5, the sintering temperature must be high, and the insulating resistance is greatly lowered due to plating. On the other hand, if the amount of $TiO_2$ is 0 (zero) as in sample No. 20-6, such is unfavorable since the insulating resistance is greatly lowered due to plating.

By adding $Al_2O_3$ and $ZrO_2$ to the oxide glass of $Li_2O$—MO—RO—$(Ti,Si)O_2$, obtained are monolithic ceramic capacitors having an insulating resistance at 25° C. and 125° C. of not lower than 5000 M$\Omega$·$\mu$F. and not lower than 1000 M$\Omega$·$\mu$F., respectively, such as sample Nos. 20-12 to 20-14. However, if the amount of $Al_2O_3$ is more than 20% by weight as in sample No. 20-19, or if the amount of $ZrO_2$ is more than 10 parts by weight as in sample No. 20-20, the sinterability is lowered, the dielectric constant is less than 3000, and the insulating resistance is unfavorably lowered. In addition, the insulating resistance is greatly lowered due to plating.

As is obvious from the description as hereinabove, since a material that is not reduced and is not therefore converted into a semiconductor even when fired in a reducing atmosphere, is used in the dielectric ceramic layers constituting the monolithic ceramic capacitor of the present invention, a base metal nickel or nickel alloy can be used as the material of the electrodes for the condenser. The dielectric material used in the present invention can be sintered at relative low temperatures of not higher than 1300° C. Therefore, the monolithic ceramic capacitor of the present invention can be produced at low cost.

In addition, the monolithic ceramic capacitor of the present invention, comprising the dielectric material, has a dielectric constant of not smaller than 3000. Further, the temperature-dependent characteristics of the electrostatic capacity of the monolithic ceramic capacitor of the present invention, though having such a high dielectric constant, satisfy the B characteristic stipulated in JIS Standard and the X7R characteristic stipulated in EIA Standard. Moreover, the insulating resistance of the monolithic ceramic capacitor of the present invention is high or is not lower than 3000 M$\Omega$·$\mu$F., in terms of the product (CR) of itself (R) and the electrostatic capacity (C), and therefore the condenser has excellent life characteristics at high temperatures. In addition, the grains existing in the sintered dielectrics that constitute the dielectric ceramic layers in the condenser of the present invention have a small grain size of not larger than 1 $\mu$m. Therefore, even when the dielectric ceramic layers constituting the condenser of the present invention are made thin, the number of the grains existing in the layers is not reduced, being different from those of conventional monolithic ceramic capacitors. Accordingly, the monolithic ceramic capacitor of the present invention may be small-sized and has high reliability and a large capacity.

In addition, since the dielectric ceramic layers constituting the condenser of the present invention contain oxide glass of $Li_2O$—RO—$(Ti,Si)$—$O_2$, the electric characteristics of the condenser are not worsened by plating.

While the invention has been described in detail and with reference to specific embodiments thereof, it will be apparent to one skilled in the art that various changes and modifications can be made therein without departing from the spirit and scope thereof.

TABLE 1

| Type of $BaTiO_3$ | Content of Impurities (wt. %) | | | | | Mean Grain Size ($\mu$m) |
| --- | --- | --- | --- | --- | --- | --- |
| | Alkali metal oxides | SrO | CaO | $SiO_2$ | $Al_2O_3$ | |
| A | 0.003 | 0.012 | 0.001 | 0.010 | 0.005 | 0.60 |
| B | 0.030 | 0.007 | 0.002 | 0.021 | 0.009 | 0.51 |
| C | 0.012 | 0.179 | 0.018 | 0.155 | 0.071 | 0.72 |
| *D | 0.094 | 0.030 | 0.001 | 0.043 | 0.005 | 0.62 |

*Outside the scope of the invention

TABLE 2

| Sample No. | Type of BaTiO₃ | $\alpha$ | $\beta$ | $\alpha/\beta$ | x | m | MgO (mols) | MnO (mols) | Oxide Glass (parts by weight) |
|---|---|---|---|---|---|---|---|---|---|
| *1-1 | A | 0.000 | 0.010 | — | 0.50 | 1.010 | 1.00 | 0.10 | 0.50 |
| *1-2 | A | 0.010 | 0.000 | 0 | — | 1.010 | 1.00 | 0.10 | 0.50 |
| *1-3 | A | 0.010 | 0.030 | 3 | 0.00 | 1.010 | 1.00 | 0.10 | 0.50 |
| *1-4 | A | 0.010 | 0.020 | 2 | 0.50 | 0.990 | 1.00 | 0.10 | 0.50 |
| *1-5 | A | 0.010 | 0.030 | 3 | 0.50 | 1.010 | 0.00 | 0.10 | 0.50 |
| *1-6 | A | 0.010 | 0.010 | 1 | 0.60 | 1.010 | 1.00 | 0.00 | 0.50 |
| *1-7 | A | 0.010 | 0.020 | 2 | 0.60 | 1.010 | 1.50 | 0.20 | 0.00 |
| 1-8 | A | 0.005 | 0.005 | 1 | 1.00 | 1.010 | 1.20 | 0.10 | 0.80 |
| 1-9 | A | 0.0025 | 0.0025 | 1 | 0.50 | 1.010 | 0.50 | 0.20 | 0.20 |
| 1-10 | A | 0.006 | 0.009 | 3/2 | 0.50 | 1.010 | 1.50 | 0.30 | 1.00 |
| 1-11 | B | 0.008 | 0.048 | 6 | 0.80 | 1.010 | 1.50 | 0.07 | 0.80 |
| 1-12 | A | 0.007 | 0.014 | 2 | 0.50 | 1.000 | 1.50 | 0.35 | 0.80 |
| 1-13 | C | 0.010 | 0.030 | 3 | 0.50 | 1.015 | 1.20 | 0.20 | 1.00 |
| 1-14 | A | 0.030 | 0.060 | 2 | 0.50 | 1.035 | 3.00 | 0.05 | 3.00 |
| 1-15 | A | 0.020 | 0.005 | 1/4 | 0.80 | 1.020 | 2.00 | 2.00 | 1.00 |
| 1-16 | A | 0.012 | 0.004 | 1/3 | 1.00 | 1.010 | 1.50 | 0.40 | 1.00 |
| *1-17 | A | 0.050 | 0.025 | 1/2 | 0.50 | 1.010 | 1.00 | 0.20 | 0.80 |
| *1-18 | A | 0.020 | 0.080 | 4 | 0.50 | 1.010 | 1.00 | 0.20 | 0.80 |
| *1-19 | A | 0.005 | 0.050 | 10 | 0.50 | 1.010 | 1.00 | 0.20 | 0.80 |
| *1-20 | A | 0.005 | 0.010 | 2 | 0.50 | 1.050 | 1.00 | 0.20 | 0.80 |
| *1-21 | A | 0.005 | 0.010 | 2 | 0.50 | 1.010 | 5.00 | 0.20 | 0.80 |
| *1-22 | A | 0.005 | 0.010 | 2 | 0.50 | 1.010 | 1.00 | 5.00 | 0.80 |
| *1-23 | A | 0.005 | 0.010 | 2 | 0.50 | 1.010 | 1.00 | 0.20 | 5.00 |
| *1-24 | D | 0.006 | 0.009 | 3/2 | 0.80 | 1.015 | 1.50 | 0.20 | 1.00 |

Essential Component: $(1-\alpha-\beta)(BaO)_m TiO_2 + \alpha Y_2 O_3 + \beta(Co_{1-x} Ni_x)O$

*Outside the scope of the invention

TABLE 3

| Sample No. | Baking Temperature (°C.) | Dielectric Constant $\epsilon$ | Dielectric Loss tan δ (%) | Variation in Temperature-dependent Capacity ΔC/C₂₀ °C. (%) −25° C. | 85° C. | Variation (%) in Temperature-dependent Capacity ΔC/C₂₅ °C. (%) −55° C. | 125° C. | Max | Product of CR (MΩ · μF) 25° C. | 25° C. | Mean Life Time (hrs) | Grain Size (μm) |
|---|---|---|---|---|---|---|---|---|---|---|---|---|
| *1-1 | 1280 | 2740 | 3.2 | −12.0 | 22.0 | −27.00 | 9.5 | 30.0 | 10500 | 3740 | 4 | 1.50 |
| *1-2 | 1280 | 3310 | 2.6 | −2.1 | −12.0 | −3.4 | −20.0 | 20.0 | 2730 | 220 | 54 | 0.72 |
| *1-3 | 1280 | 3130 | 1.9 | 0.7 | −6.8 | 1.2 | −9.1 | 9.1 | 4260 | 470 | 153 | 0.75 |
| *1-4 | 1280 | As the baked sample became a semiconductor, the measurement was impossible. | | | | | | | | | | 1.00 |
| *1-5 | 1280 | 3260 | 2.0 | 0.8 | −11.0 | 0.9 | −14.6 | 14.6 | 3500 | 450 | 102 | 0.79 |
| *1-6 | 1280 | 3190 | 1.9 | 0.9 | −6.4 | 1.3 | −8.3 | 8.3 | 2060 | 230 | 44 | 0.75 |
| *1-7 | 1360 | 3010 | 2.2 | −0.5 | −6.0 | −0.7 | −6.2 | 6.2 | 2840 | 250 | 22 | 0.69 |
| 1-8 | 1280 | 3550 | 2.0 | 0.9 | −7.6 | 0.6 | −10.9 | 10.9 | 5410 | 1830 | 295 | 0.71 |
| 1-9 | 1300 | 3530 | 2.1 | 0.7 | −8.0 | 0.8 | −13.0 | 13.0 | 4330 | 880 | 257 | 0.71 |
| 1-10 | 1260 | 3230 | 1.8 | 0.4 | −5.5 | 0.3 | −5.1 | 5.5 | 5870 | 1860 | 305 | 0.75 |
| 1-11 | 1280 | 3070 | 1.7 | 0.1 | −7.5 | −0.1 | −11.7 | 11.7 | 5620 | 1650 | 271 | 0.67 |
| 1-12 | 1280 | 3260 | 2.0 | 0.32 | −6.8 | 0.4 | −9.1 | 9.1 | 4280 | 1090 | 266 | 0.73 |
| 1-12 | 1280 | 3140 | 1.8 | −1.0 | −5.8 | −1.2 | −6.6 | 6.6 | 4710 | 1460 | 283 | 0.83 |
| 1-14 | 1300 | 3030 | 1.8 | −0.8 | −5.3 | −1.1 | −3.0 | 5.5 | 3580 | 700 | 261 | 0.75 |
| 1-15 | 1300 | 3100 | 1.9 | 0.7 | −6.8 | 1.2 | −9.1 | 9.1 | 4090 | 870 | 258 | 0.73 |

*Outside the scope of the invention

55

TABLE 4

| Sample No. | Baking Temperature (°C.) | Dielectric Constant ε | Dielectric Loss tan δ (%) | Variation in Temperature-dependent Capacity ΔC/C$_{20}$ °C. (%) -25° C. | 85° C. | Variation (%) in Temperature-dependent Capacity ΔC/C$_{25}$ °C. (%) -55° C. | 125° C. | Max | Product of CR (MΩ · μF) 25° C. | 25° C. | Mean Life Time (hrs) | Grain Size (μm) |
|---|---|---|---|---|---|---|---|---|---|---|---|---|
| 1-16 | 1280 | 3210 | 1.8 | 0.3 | -5.3 | 0.2 | -4.9 | 5.3 | 4660 | 1100 | 307 | 0.73 |
| *1-17 | 1350 | 2510 | 2.1 | -1.1 | -8.5 | -1.5 | -13.9 | 13.9 | 2790 | 360 | 109 | 0.70 |
| *1-18 | 1280 | 3460 | 1.9 | 1.5 | -9.8 | 1.9 | -16.4 | 16.4 | 4050 | 460 | 158 | 0.75 |
| *1-19 | 1280 | 3530 | 2.2 | 1.7 | -11.2 | 1.5 | -18.2 | 18.2 | 4780 | 780 | 256 | 0.75 |
| *1-20 | 1360 | As the sample was not sintered, the measurement was impossible. | | | | | | | | | | |
| *1-21 | 1360 | 2360 | 2.0 | -1.2 | -1.3 | -2.4 | 6.1 | 6.1 | 2970 | 390 | 251 | 0.68 |
| *1-22 | 1280 | 3090 | 1.8 | 0.9 | -6.6 | 0.6 | -8.9 | 8.9 | 4110 | 280 | 85 | 0.72 |
| *1-23 | 1200 | 2100 | 1.2 | 1.3 | -10.6 | 1.7 | -17.3 | 17.3 | 5630 | 1620 | 297 | 0.70 |
| *1-24 | 1280 | 2620 | 1.7 | 0.2 | -4.8 | 0.4 | -5.2 | 5.2 | 4770 | 1310 | 266 | 0.71 |

*Outside the scope of the invention

TABLE 5

| Sample No. | Amount of Oxide Glass Added (wt. %) | Composition of Oxide Glass Main Component (mol %) | | | | | | | | | Side Component (wt. %) | |
|---|---|---|---|---|---|---|---|---|---|---|---|---|
| | | ZnO | MnO | Li$_2$O | MgO | CaO | SrO | BaO | SiO$_2$ | TiO$_2$ | Al$_2$O$_3$ | ZrO$_2$ |
| *2-1 | 0.00 | — | — | — | — | — | — | — | — | — | — | — |
| *2-2 | 1.00 | 2 | 4 | 1 | 2 | 7 | 7 | 7 | 63 | 7 | 0 | 0 |
| *2-3 | 1.00 | 0 | 6 | 20 | 0 | 0 | 0 | 4 | 60 | 10 | 0 | 0 |
| *2-4 | 1.00 | 4 | 2 | 20 | 0 | 10 | 10 | 24 | 25 | 5 | 0 | 0 |
| *2-5 | 1.00 | 0 | 6 | 19 | 0 | 0 | 2 | 18 | 10 | 45 | 0 | 0 |
| *2-6 | 1.00 | 4 | 2 | 19 | 0 | 0 | 2 | 18 | 55 | 0 | 0 | 0 |
| 2-7 | 1.00 | 4 | 2 | 19 | 0 | 0 | 0 | 5 | 60 | 10 | 0 | 0 |
| 2-8 | 1.00 | 0 | 0 | 19 | 2 | 6 | 6 | 12 | 48 | 7 | 0 | 0 |
| 2-9 | 1.00 | 2 | 4 | 19 | 10 | 10 | 10 | 10 | 30 | 5 | 0 | 0 |
| 2-10 | 1.00 | 40 | 0 | 2 | 0 | 3 | 3 | 3 | 44 | 5 | 0 | 0 |
| 2-11 | 1.00 | 0 | 2 | 45 | 0 | 3 | 0 | 10 | 38 | 2 | 0 | 0 |
| 2-12 | 1.00 | 4 | 2 | 24 | 1 | 6 | 6 | 7 | 47 | 3 | 20 | 0 |
| 2-13 | 1.00 | 4 | 2 | 24 | 1 | 6 | 6 | 7 | 47 | 3 | 0 | 10 |
| 2-14 | 1.00 | 4 | 2 | 24 | 1 | 6 | 6 | 7 | 47 | 3 | 5 | 2 |
| *2-15 | 1.00 | 0 | 45 | 2 | 0 | 0 | 1 | 3 | 44 | 5 | 0 | 0 |
| *2-16 | 1.00 | 4 | 2 | 50 | 1 | 0 | 0 | 8 | 32 | 3 | 0 | 0 |
| *2-17 | 1.00 | 2 | 4 | 14 | 5 | 5 | 15 | 20 | 30 | 5 | 0 | 0 |
| *2-18 | 1.00 | 0 | 2 | 15 | 0 | 2 | 0 | 6 | 65 | 10 | 0 | 0 |
| *2-19 | 1.00 | 4 | 2 | 24 | 1 | 6 | 6 | 7 | 47 | 3 | 30 | 0 |
| *2-20 | 1.00 | 4 | 2 | 24 | 1 | 6 | 6 | 7 | 47 | 3 | 0 | 20 |

*Outside the scope of the invention

TABLE 6

| Sample No. | Baking Temperature (°C.) | Dielectric Constant ε | Dielectric Loss tan δ (%) | Variation in Temperature-dependent Capacity ΔC/C$_{20}$ °C. (%) -25° C. | 85° C. | Variation (%) in Temperature-dependent Capacity ΔC/C$_{25}$ °C. (%) -55° C. | 125° C. | Max | Product of CR (MΩ · μF) Before Plating 25° C. | 125° C. | After Plated 25° C. | 125° C. |
|---|---|---|---|---|---|---|---|---|---|---|---|---|
| *2-1 | 1360 | 3050 | 2.3 | -0.8 | -5.4 | -1.1 | -4.3 | 5.4 | 2580 | 300 | 1500 | 90 |
| *2-2 | 1340 | 3670 | 3.1 | -13.4 | 6.7 | -20.1 | 10.2 | 20.1 | 4350 | 940 | 4070 | 630 |
| *2-3 | 1320 | 3270 | 2.0 | 0.1 | -5.8 | -0.1 | -6.8 | 6.8 | 4110 | 930 | 4110 | 920 |
| *2-4 | 1320 | 3230 | 1.8 | 0.1 | -7.8 | 0.3 | -11.9 | 11.9 | 4520 | 1100 | 2780 | 270 |
| *2-5 | 1340 | 3190 | 1.9 | 0.4 | -5.2 | 0.2 | -6.3 | 6.3 | 4460 | 1050 | 1990 | 130 |
| *2-6 | 1300 | 3270 | 2.0 | 0.3 | -6.1 | 0.4 | -7.3 | 7.3 | 4010 | 1100 | 2590 | 220 |

TABLE 6-continued

| Sample No. | Baking Temperature (°C.) | Dielectric Constant ε | Dielectric Loss tan δ (%) | Variation in Temperature-dependent Capacity ΔC/C$_{20}$ °C. (%) −25° C. | 85° C. | Variation (%) in Temperature-dependent Capacity ΔC/C$_{25}$ °C. (%) −55° C. | 125° C. | Max | Product of CR (MΩ · μF) Before Plating 25° C. | 125° C. | After Plated 25° C. | 125° C. |
|---|---|---|---|---|---|---|---|---|---|---|---|---|
| 2-7 | 1280 | 3250 | 1.9 | −0.1 | −5.7 | −0.5 | −6.6 | 6.6 | 4250 | 1320 | 4270 | 1320 |
| 2-8 | 1280 | 3300 | 2.0 | −0.2 | −5.9 | −0.3 | −6.8 | 6.8 | 4090 | 1080 | 4090 | 1090 |
| 2-9 | 1280 | 3170 | 1.8 | 0.2 | −6.5 | 0.2 | −7.1 | 7.1 | 4870 | 880 | 4650 | 850 |
| 2-10 | 1280 | 3110 | 1.8 | 0.2 | −5.3 | 0.3 | −5.3 | 5.5 | 5010 | 970 | 4930 | 950 |
| 2-11 | 1260 | 3040 | 2.0 | −0.3 | −5.3 | −0.6 | −4.9 | 5.2 | 4750 | 1220 | 4410 | 1080 |
| 2-12 | 1280 | 3220 | 1.9 | −0.3 | −5.6 | −0.4 | −6.4 | 6.4 | 6530 | 2300 | 6520 | 2280 |
| 2-13 | 1280 | 3180 | 1.8 | −0.3 | −5.3 | −0.3 | −6.1 | 6.1 | 6220 | 2230 | 5240 | 2230 |
| 2-14 | 1280 | 3280 | 1.9 | −0.2 | −5.5 | −0.3 | −6.2 | 6.2 | 5840 | 2060 | 5850 | 2100 |
| *2-15 | 1340 | 2820 | 2.0 | −0.3 | −4.5 | −0.7 | −5.0 | 5.0 | 4030 | 610 | 4010 | 550 |

*Outside the scope to the invention

TABLE 7

| Sample No. | Baking Temperature (°C.) | Dielectric Constant ε | Dielectric Loss tan δ (%) | Variation in Temperature-dependent Capacity ΔC/C$_{20}$ °C. (%) −25° C. | 85° C. | Variation (%) in Temperature-dependent Capacity ΔC/C$_{25}$ °C. (%) −55° C. | 125° C. | Max | Product of CR (MΩ · μF) Before Plating 25° C. | 125° C. | After Plated 25° C. | 125° C. |
|---|---|---|---|---|---|---|---|---|---|---|---|---|
| *2-16 | 1280 | | | Measurement was impossible due to de-lamination. | | | | | 4150 | 720 | 3820 | 170 |
| *2-17 | 1360 | 2950 | 2.2 | −0.5 | −5.3 | −0.6 | −5.5 | 5.6 | | | | |
| *2-18 | 1340 | 3300 | 2.1 | 1.1 | −8.8 | 1.8 | −12.0 | 12.0 | 3830 | 740 | 3520 | 680 |
| *2-19 | 1360 | 2720 | 2.5 | −1.2 | −4.3 | −2.4 | 5.2 | 5.2 | 2920 | 280 | 880 | 50 |
| *2-20 | 1360 | 2560 | 2.3 | −1.0 | −4.0 | −1.8 | 6.4 | 6.4 | 2780 | 150 | 740 | 30 |

*Outside the scope of the invention

TABLE 8

| Sample No. | Essential Component $(1-\alpha-\beta)(BaO)_m TiO_2 + \alpha Y_2O_3 + \beta(Zn_{1-x}Ni_x)O$ Type of BaTiO$_3$ | α | β | α/β | x | m | Side Component MgO (mols) | MnO (mols) | Oxide Glass (parts by weight) |
|---|---|---|---|---|---|---|---|---|---|
| *10-1 | A | 0.000 | 0.020 | — | 0.50 | 1.010 | 1.00 | 0.10 | 0.80 |
| *10-2 | A | 0.010 | 0.000 | 0 | — | 1.010 | 1.00 | 0.10 | 0.50 |
| *10-3 | A | 0.015 | 0.045 | 3 | 0.00 | 1.010 | 1.00 | 0.10 | 0.50 |
| *10-4 | A | 0.010 | 0.020 | 2 | 0.50 | 0.990 | 1.00 | 0.10 | 0.50 |
| *10-5 | A | 0.010 | 0.030 | 3 | 0.50 | 1.010 | 0.00 | 0.10 | 0.80 |
| *10-6 | A | 0.010 | 0.010 | 1 | 0.50 | 1.010 | 1.00 | 0.00 | 0.50 |
| *10-7 | A | 0.010 | 0.020 | 2 | 0.90 | 1.010 | 1.50 | 0.20 | 0.00 |
| *10-8 | A | 0.020 | 0.070 | 7/2 | 1.00 | 1.015 | 1.50 | 0.10 | 1.00 |
| 10-9 | A | 0.0025 | 0.0025 | 1 | 0.80 | 1.000 | 2.50 | 0.25 | 0.50 |
| 10-10 | A | 0.006 | 0.009 | 3/2 | 0.50 | 1.010 | 1.50 | 0.30 | 1.20 |
| 10-11 | B | 0.006 | 0.048 | 8 | 0.40 | 1.010 | 1.20 | 0.07 | 0.80 |
| 10-12 | A | 0.004 | 0.008 | 2 | 0.20 | 1.005 | 0.60 | 0.20 | 0.20 |
| 10-13 | C | 0.015 | 0.030 | 4 | 0.30 | 1.015 | 1.00 | 0.30 | 1.00 |
| 10-14 | A | 0.030 | 0.080 | 8/3 | 0.10 | 1.035 | 0.20 | 0.05 | 3.00 |
| 10-15 | A | 0.025 | 0.005 | 1/5 | 0.20 | 1.020 | 2.00 | 2.00 | 1.50 |
| 10-16 | A | 0.016 | 0.004 | 1/4 | 0.05 | 1.010 | 1.50 | 0.40 | 1.00 |
| *10-17 | A | 0.050 | 0.030 | 3/5 | 0.50 | 1.010 | 1.00 | 0.20 | 0.80 |
| *10-18 | A | 0.025 | 0.100 | 4 | 0.54 | 1.010 | 1.00 | 0.20 | 0.80 |
| *10-19 | A | 0.007 | 0.070 | 10 | 0.50 | 1.010 | 1.00 | 0.20 | 0.80 |
| *10-20 | A | 0.005 | 0.010 | 2 | 0.50 | 1.050 | 1.00 | 0.20 | 0.80 |
| *10-21 | A | 0.005 | 0.010 | 2 | 0.50 | 1.010 | 5.00 | 0.20 | 0.80 |
| *10-22 | A | 0.005 | 0.010 | 2 | 0.50 | 1.010 | 1.00 | 5.00 | 0.08 |
| *10-23 | A | 0.005 | 0.010 | 2 | 0.50 | 1.010 | 1.00 | 0.20 | 5.00 |
| *10-24 | D | 0.006 | 0.009 | 3/2 | 0.80 | 1.015 | 1.50 | 0.20 | 1.00 |

*Outside the scope of the invention

TABLE 9

| Sample No. | Baking Temperature (°C.) | Dielectric Constant ε | Dielectric Loss tan δ (%) | Variation in Temperature dependent Capacity ΔC/C₂₀ °C. (%) | | Variation (%) in Temperature-dependent Capacity ΔC/C₂₅ °C. (%) | | | Product of CR (MΩ·μF) | | Mean Life Time (hrs) | Grain Size (μm) |
|---|---|---|---|---|---|---|---|---|---|---|---|---|
| | | | | −25° C. | 85° C. | −55° C. | 125° C. | Max | 25° C. | 125° C. | | |
| *10-1 | 1280 | 2410 | 3.0 | −5.2 | 10.8 | −10.1 | 15.1 | 24.0 | 8820 | 4110 | 7 | 1.39 |
| *10-2 | 1280 | 3280 | 2.7 | −1.9 | −11.8 | −3.3 | −19.3 | 19.5 | 2770 | 260 | 61 | 0.72 |
| *10-3 | 1320 | 2780 | 2.0 | 0.4 | −5.8 | 0.3 | −6.7 | 6.7 | 5180 | 630 | 253 | 0.75 |
| *10-4 | 1280 | | | As the baked sample became a semiconductor, the measurement was impossible. | | | | | | | | 1.00 |
| *10-5 | 1280 | 3180 | 2.0 | 0.7 | −10.6 | 0.8 | −14.3 | 14.3 | 4040 | 480 | 133 | 0.78 |
| *10-6 | 1280 | 3190 | 1.8 | 0.8 | −6.2 | 1.1 | −7.9 | 7.9 | 2530 | 310 | 63 | 0.74 |
| *10-7 | 1360 | 3030 | 2.1 | −1.0 | −5.6 | −1.3 | −5.5 | 5.7 | 2790 | 280 | 24 | 0.69 |
| *10-8 | 1280 | 3130 | 1.8 | 1.3 | −9.2 | 1.8 | −14.1 | 14.1 | 4960 | 1650 | 259 | 0.72 |
| 10-9 | 1300 | 3250 | 1.8 | 0.4 | −6.5 | 0.6 | −8.8 | 8.9 | 4510 | 990 | 262 | 0.71 |
| 10-10 | 1260 | 3170 | 1.7 | 0.2 | −5.2 | 0.2 | −4.9 | 5.2 | 5900 | 1780 | 303 | 0.74 |
| 10-11 | 1280 | 3090 | 1.6 | 0.2 | −7.9 | 0.3 | −12.3 | 12.5 | 5710 | 1720 | 282 | 0.67 |
| 10-12 | 1300 | 3320 | 2.1 | −0.3 | −5.8 | −0.7 | −5.3 | 5.3 | 4890 | 1150 | 263 | 0.70 |
| 10-12 | 1280 | 3070 | 1.6 | −0.7 | −6.1 | −1.0 | −6.8 | 6.9 | 5470 | 1950 | 320 | 0.81 |
| 10-14 | 1300 | 3000 | 1.7 | −1.0 | −5.0 | −1.5 | −4.3 | 5.2 | 3750 | 820 | 258 | 0.73 |
| 10-15 | 1300 | 3200 | 2.0 | 1.2 | −7.3 | 1.5 | 10.5 | −10.5 | 4900 | 1360 | 264 | 0.73 |

*Outside the scope of the invention

TABLE 10

| Sample No. | Baking Temperature (°C.) | Dielectric Constant ε | Dielectric Loss tan δ (%) | Variation in Temperature-dependent Capacity ΔC/C₂₀ °C. (%) | | Variation (%) in Temperature-dependent Capacity ΔC/C₂₅ °C. (%) | | | Product of CR (MΩ·μF) | | Mean Life Time (hrs) | Grain Size (μm) |
|---|---|---|---|---|---|---|---|---|---|---|---|---|
| | | | | −25° C. | 85° C. | −55° C. | 125° C. | Max | 25° C. | 125° C. | | |
| 10-16 | 1280 | 3170 | 1.9 | −0.1 | −4.7 | −0.5 | −4.3 | 5.0 | 5780 | 1890 | 303 | 0.73 |
| *10-17 | 1350 | 2280 | 2.0 | −0.7 | −8.1 | −1.2 | −12.8 | 12.8 | 2880 | 410 | 127 | 0.69 |
| *10-18 | 1300 | 3090 | 1.9 | 1.0 | −8.8 | 1.5 | −15.3 | 15.5 | 4210 | 390 | 109 | 0.71 |
| *10-19 | 1300 | 3320 | 2.1 | 1.3 | −10.8 | 1.7 | −17.5 | 17.5 | 5380 | 1020 | 267 | 0.73 |
| *10-20 | 1380 | | | As the sample was not sintered, the measurement was impossible. | | | | | | | | |
| *10-21 | 1380 | 2240 | 1.9 | −1.2 | −1.8 | −2.5 | 7.0 | 7.0 | 2890 | 420 | 253 | 0.68 |
| *10-22 | 1300 | 3030 | 1.8 | 0.7 | −6.3 | 0.8 | −8.3 | 8.3 | 4370 | 300 | 87 | 0.72 |
| *10-23 | 1220 | 2220 | 1.3 | 1.6 | −10.8 | 2.0 | −16.8 | 170 | 5480 | 1780 | 288 | 0.69 |
| *10-24 | 1300 | 2540 | 1.8 | 0.2 | −4.4 | 0.3 | −5.0 | 5.0 | 4920 | 1530 | 271 | 0.71 |

*Outside the scope of the invention

TABLE 11

| Sample No. | Amount of Oxide Glass Added (wt. %) | Composition of Oxide Glass | | | | | | | | | | |
|---|---|---|---|---|---|---|---|---|---|---|---|---|
| | | Main Component (mol %) | | | | | | | | | Side Component (wt. %) | |
| | | ZnO | MnO | Li₂O | MgO | CaO | SrO | BaO | SiO₂ | TiO₂ | Al₂O₃ | ZrO₂ |
| *20-1 | 0.00 | — | — | — | — | — | — | — | — | — | — | — |
| *20-2 | 1.00 | 4 | 2 | 1 | 2 | 7 | 7 | 7 | 63 | 7 | 0 | 0 |
| *20-3 | 1.00 | 6 | 0 | 20 | 0 | 0 | 0 | 4 | 60 | 10 | 0 | 0 |
| *20-4 | 1.00 | 2 | 4 | 20 | 0 | 10 | 10 | 24 | 25 | 5 | 0 | 0 |
| *20-5 | 1.00 | 0 | 6 | 19 | 0 | 0 | 2 | 18 | 10 | 45 | 0 | 0 |
| *20-6 | 1.00 | 2 | 4 | 19 | 0 | 0 | 2 | 18 | 55 | 0 | 0 | 0 |
| 20-7 | 1.00 | 2 | 4 | 19 | 0 | 0 | 0 | 5 | 60 | 10 | 0 | 0 |
| 20-8 | 1.00 | 0 | 0 | 19 | 2 | 6 | 6 | 12 | 48 | 7 | 0 | 0 |
| 20-9 | 1.00 | 4 | 2 | 19 | 10 | 10 | 10 | 10 | 30 | 5 | 0 | 0 |
| 20-10 | 1.00 | 40 | 0 | 2 | 0 | 3 | 3 | 3 | 44 | 5 | 0 | 0 |
| 20-11 | 1.00 | 0 | 2 | 45 | 0 | 3 | 0 | 10 | 38 | 2 | 0 | 0 |
| 20-12 | 1.00 | 4 | 2 | 24 | 1 | 6 | 6 | 7 | 47 | 3 | 20 | 0 |
| 20-13 | 1.00 | 4 | 2 | 24 | 1 | 6 | 6 | 7 | 47 | 3 | 0 | 10 |
| 20-14 | 1.00 | 4 | 2 | 24 | 1 | 6 | 6 | 7 | 47 | 3 | 5 | 2 |
| *20-15 | 1.00 | 0 | 45 | 2 | 0 | 0 | 1 | 3 | 44 | 5 | 0 | 0 |
| *20-16 | 1.00 | 4 | 2 | 50 | 1 | 0 | 0 | 8 | 32 | 3 | 0 | 0 |
| *20-17 | 1.00 | 2 | 4 | 14 | 5 | 5 | 15 | 20 | 30 | 5 | 0 | 0 |
| *20-18 | 1.00 | 0 | 2 | 15 | 0 | 2 | 0 | 6 | 65 | 10 | 0 | 0 |

TABLE 11-continued

| Sample No. | Amount of Oxide Glass Added (wt. %) | Composition of Oxide Glass | | | | | | | | | | |
|---|---|---|---|---|---|---|---|---|---|---|---|---|
| | | Main Component (mol %) | | | | | | | | Side Component (wt. %) | | |
| | | ZnO | MnO | $Li_2O$ | MgO | CaO | SrO | BaO | $SiO_2$ | $TiO_2$ | $Al_2O_3$ | $ZrO_2$ |
| *20-19 | 1.00 | 4 | 2 | 24 | 1 | 6 | 6 | 7 | 47 | 3 | 30 | 0 |
| *20-20 | 1.00 | 4 | 2 | 24 | 1 | 6 | 6 | 7 | 47 | 3 | 0 | 20 |

*Outside the scope of the invention

TABLE 12

| Sample No. | Baking Temperature (°C.) | Dielectric Constant $\epsilon$ | Dielectric Loss tan δ (%) | Variation in Temperature-dependent Capacity $\Delta C/C_{20}$ °C. (%) | | Variation (%) in Temperature-dependent Capacity $\Delta C/C_{25}$ °C. (%) | | | Product of CR (MΩ · μF) | | | |
|---|---|---|---|---|---|---|---|---|---|---|---|---|
| | | | | | | | | | Before Plating | | After Plated | |
| | | | | −25° C. | 85° C. | −55° C. | 125° C. | Max | 25° C. | 125° C. | 25° C. | 125° C. |
| *20-1 | 1360 | 3010 | 2.4 | −1.2 | −4.7 | −1.7 | −4.5 | 5.0 | 2720 | 270 | 1270 | 50 |
| *20-2 | 1340 | 3420 | 2.8 | −12.1 | 7.3 | −17.6 | 13.3 | 17.6 | 4510 | 980 | 4410 | 890 |
| *20-3 | 1320 | 3110 | 2.1 | −0.2 | −5.6 | −0.4 | −5.8 | 6.0 | 4180 | 760 | 4190 | 760 |
| *20-4 | 1320 | 3230 | 1.9 | 0.2 | −7.3 | 0.4 | −10.2 | 10.2 | 4280 | 930 | 2220 | 200 |
| *20-5 | 1340 | 3130 | 1.9 | 0.1 | −5.0 | 0.1 | −6.0 | 6.0 | 4340 | 860 | 1630 | 90 |
| *20-6 | 1300 | 3190 | 2.1 | 0.4 | −6.4 | 0.6 | −7.0 | 7.0 | 4130 | 1210 | 2400 | 160 |
| *20-7 | 1280 | 3180 | 1.8 | −0.3 | −5.5 | −0.8 | −5.9 | 5.9 | 4560 | 1440 | 4560 | 1430 |
| 20-8 | 1280 | 3220 | 2.1 | −0.4 | −5.7 | −0.6 | −6.1 | 6.1 | 4350 | 1110 | 4350 | 1090 |
| 20-9 | 1280 | 3110 | 1.9 | 0.3 | −6.1 | 0.4 | −6.8 | 7.0 | 5020 | 950 | 4350 | 930 |
| 20-10 | 1280 | 3050 | 1.9 | 0.1 | −4.8 | 0.1 | −5.2 | 5.2 | 5330 | 1030 | 52980 | 1040 |
| 20-11 | 1260 | 3010 | 2.0 | −0.5 | −4.9 | −0.9 | −5.0 | 5.0 | 4580 | 1140 | 4460 | 1050 |
| 20-12 | 1280 | 3170 | 1.9 | −0.4 | −5.4 | −0.6 | −6.2 | 6.2 | 6630 | 2350 | 6630 | 2350 |
| 20-13 | 1280 | 3120 | 1.9 | −0.5 | −5.1 | −0.6 | −5.8 | 6.0 | 6340 | 2280 | 6350 | 2260 |
| 20-14 | 1280 | 3210 | 1.9 | −0.3 | −5.2 | −0.4 | −6.0 | 6.0 | 5970 | 2100 | 5970 | 2120 |
| *20-15 | 1340 | 2770 | 2.1 | −0.5 | −4.8 | −1.1 | −5.3 | 5.3 | 4350 | 670 | 4350 | 640 |

*Outside the scope of the invention

TABLE 13

| Sample No. | Baking Temperature (°C.) | Dielectric Constant $\epsilon$ | Dielectric Loss tan δ (%) | Variation in Temperature-dependent Capacity $\Delta C/C_{20}$ °C. (%) | | Variation (%) in Temperature-dependent Capacity $\Delta C/C_{25}$ °C. (%) | | | Product of CR (MΩ · μF) | | | |
|---|---|---|---|---|---|---|---|---|---|---|---|---|
| | | | | | | | | | Before Plating | | After Plated | |
| | | | | −25° C. | 85° C. | −55° C. | 125° C. | Max | 25° C. | 125° C. | 25° C. | 125° C. |
| *20-16 | 1280 | | | Measurement was impossible due to de-lamination. | | | | | | | | |
| *20-17 | 1360 | 2890 | 2.3 | −0.4 | −4.6 | −0.5 | −4.8 | 4.8 | 4070 | 670 | 2280 | 150 |
| *20-18 | 1340 | 3260 | 2.1 | 0.9 | −8.2 | 1.0 | −11.4 | 11.4 | 3340 | 580 | 3340 | 550 |
| *20-19 | 1360 | 2680 | 2.5 | −1.1 | −4.0 | −2.2 | 4.9 | 5.0 | 2980 | 260 | 790 | 80 |
| *20-20 | 1360 | 2490 | 2.4 | −0.9 | −4.2 | −1.5 | 5.5 | 5.5 | 2810 | 170 | 650 | 50 |

*Outside the scope of the invention

What is claimed is:

1. A monolithic ceramic capacitor comprising a plurality of superposed dielectric ceramic layers, a plurality of inner electrodes disposed between the dielectric ceramic layers, and outer electrodes connected with the inner electrodes, wherein each dielectric ceramic layer is composed of a material comprising an essential component consisting of barium titanate having a content of impurities of alkali metal oxides of not higher than 0.03% by weight, yttrium oxide, nickel oxide, and optionally cobalt oxide having the composition

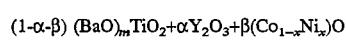

$(1-\alpha-\beta)(BaO)_m TiO_2 + \alpha Y_2O_3 + \beta(Co_{1-x}Ni_x)O$ where $0.0025 \leq \alpha \leq 0.03$,
$0.0025 \leq \beta \leq 0.06$,
$0 < \beta/\alpha \leq 6$,
$0 < x \leq 1$,
$1.000 \leq m \leq 1.035$, and a side component consisting of from 0.5 to 3.0 mols, relative to 100 mols of the essential component and in terms of MgO, of magnesium oxide and from 0.05 to 2.0 mols, relative to 100 mols of the essential component and in terms of MnO, of manganese oxide, and further containing from 0.2 to 3.0 parts by weight, relative to 100 parts by weight of the sum of the essential component and the side component, of oxide glass of $Li_2O$—$RO$—$(Ti,Si)O_2$ where R is at least one of Ba, Sr, Ca and Mg.

2. The monolithic ceramic capacitor as claimed in claim 1, wherein each inner electrode comprises a base metal selected from the group consisting of Ni, Fe, Co, W and Mo.

3. The monolithic ceramic capacitor as claimed in claim 1, wherein the oxide glass has the composition $Li_2$—$MO$—$RO$—$(Ti,Si)O_2$ in which M is at least one of Zn and Mn and $Li_2O$ is from 2 to 45 mol %, MO is from 0 to 40 mol %, RO is from 5 to 40 mol % and $(Ti,Si)O_2$ is from 35 to 70 mol % provided $SiO_2$ of $(Ti,Si)O_2$ is not less than 15 mol % and contains not more than 20 parts by weight, relative to 100 parts by weight of the above-mentioned components, of at least one of $Al_2O_3$ and $ZrO_2$ provided that $ZrO_2$ is not more than 10 parts by weight.

4. The monolithic ceramic capacitor as claimed in claim 1, having outer electrodes connected with the inner electrodes.

5. The monolithic ceramic capacitor as claimed in claim 4, wherein each outer electrode comprises a sintered layer of an electroconductive metal.

6. The monolithic ceramic capacitor as claimed in claim 4, wherein each outer electrode comprises a sintered layer of an electroconductive metal and a glass frit.

7. The monolithic ceramic capacitor as claimed in claim 6, wherein each outer electrode is composed of a lower layer and an upper layer and wherein the lower layer is a sintered layer comprising electroconductive metal powder and the upper layer is a plated layer.

8. The monolithic ceramic capacitor as claimed in claim 5, wherein each outer electrode is composed of a lower layer and an upper layer and wherein the lower layer is a sintered layer comprising electroconductive metal powder and the upper layer is a plated layer.

9. The monolithic ceramic capacitor as claimed in claim 1, wherein $\frac{1}{3} \leq \beta/\alpha \leq 3$.

10. The monolithic ceramic capacitor as claimed in claim 9, wherein $0.005 \leq \alpha \leq 0.023$, $0.005 \leq \beta \leq 0.03$, $0.5 \leq x \leq 1$, $1.01 \leq m \leq 1.02$, and the side component contains 1.2 to 2 mols of magnesium oxide and from 0.4 to 0.7 mols of manganese oxide, and further contains 0.2 to 1 parts by weight of oxide glass.

11. A monolithic ceramic capacitor comprising a plurality of superposed dielectric ceramic layers, a plurality of inner electrodes disposed between the dielectric ceramic layers, and outer electrodes connected with the inner electrodes, wherein each dielectric ceramic layer is composed of a material comprising an essential component consisting of barium titanate having a content of impurities of alkali metal oxides of not higher than 0.03% by weight, yttrium oxide, zinc oxide and nickel oxide having the composition

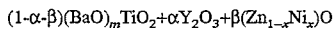

$(1-\alpha-\beta)(BaO)_m TiO_2 + \alpha Y_2O_3 + \beta(Zn_{1-x}Ni_x)O$ where $0.0025 \leq \alpha \leq 0.03$,
$0.0025 \leq \beta \leq 0.08$,
$0 < \beta/\alpha \leq 8$,
$0 < X < 1$,
$1.000 \leq m \leq 1.035$, and a side component consisting of from 0.2 to 2.5 mols, relative to 100 mols of the essential component and in terms of MgO, of magnesium oxide and from 0.05 to 2.0 mols, relative to 100 mols of the essential component and in terms of MnO, of manganese oxide, and further containing from 0.2 to 3.0 parts by weight, relative to 100 parts by weight of the sum of the essential component and the side component, of oxide glass of $Li_2O$—$RO$—$(Ti,Si)O_2$ where R indicates at least one of Ba, Sr, Ca and Mg.

12. The monolithic ceramic capacitor as claimed in claim 11, wherein each inner electrode comprises a base metal selected from the group consisting of Ni, Fe, Co, W and Mo.

13. The monolithic ceramic capacitor as claimed in claim 11, wherein the oxide glass has the composition $Li_2O$—$MO$—$RO$—$(Ti,Si)O_2$ in which M is at least one of Zn and Mn and $Li_2O$ is from 2 to 45 mol %, MO is from 0 to 40 mol %, RO is from 5 to 40 mol % and $(Ti,Si)O_2$ is from 35 to 70 mol % provided $SiO_2$ of $(Ti,Si)O_2$ is not less than 15 mol % and contains not more than 20 parts by weight, relative to 100 parts by weight of the above-mentioned components, of at least one of $Al_2O_3$ and $ZrO_2$ provided that $ZrO_2$ is not more than 10 parts by weight.

14. The monolithic ceramic capacitor as claimed in claim 11, having outer electrodes connected with the inner electrodes.

15. The monolithic ceramic capacitor as claimed in claim 14, wherein each outer electrode comprises a sintered layer of an electroconductive metal powder.

16. The monolithic ceramic capacitor as claimed in claim 14, wherein each outer electrode comprises a sintered layer of an electroconductive metal powder and a glass frit.

17. The monolithic ceramic capacitor as claimed in claim 16, wherein each outer electrode is composed of a lower layer and an upper layer and wherein the lower layer is a sintered layer comprising an electroconductive metal powder and a glass frit and the second layer is a plated layer.

18. The monolithic ceramic capacitor as claimed in claim 15, wherein each outer electrode is composed of a lower layer and an upper layer and wherein the lower layer is a sintered layer comprising an electroconductive metal powder and a glass frit and the second layer is a plated layer.

19. The monolithic ceramic capacitor as claimed in claim 11, wherein $0.25 \leq \beta/\alpha \leq 4$.

20. The monolithic ceramic capacitor as claimed in claim 19, wherein $0.004 \leq \alpha \leq 0.025$, $0.005 \leq \beta \leq 0.08$, $0.05 \leq x \leq 1$, $1.005 \leq m \leq 1.02$, and the side component contains 0.6 to 2 mols of magnesium oxide and from 0.4 to 0.7 mols of manganese oxide, and further contains 0.8 to 1.5 parts by weight of oxide glass.

* * * * *

UNITED STATES PATENT AND TRADEMARK OFFICE
CERTIFICATE OF CORRECTION

PATENT NO. : 5,659,456
DATED : August 19, 1997
INVENTOR(S) : Harunobu Sano et al It is certified that error appears in the above-identified patent and that said Letters Patent is hereby corrected as shown below:

On the title page: Item [22], the filing date "Jan.16, 1996" should read -- Jan, 12, 1996--.

Signed and Sealed this

Fifteenth Day of September, 1998

Attest:

BRUCE LEHMAN

*Attesting Officer*  *Commissioner of Patents and Trademarks*